(12) United States Patent  (10) Patent No.: US 8,301,705 B2
Wagner et al.  (45) Date of Patent: Oct. 30, 2012

(54) SUBJECT LINE PERSONALIZATION

(75) Inventors: Dirk Wagner, Schiffweiler (DE); Frank Wittig, Spiesen Elversberg (DE)

(73) Assignee: SAP AG, Walldorf (DE)

( * ) Notice: Subject to any disclaimer, the term of this patent is extended or adjusted under 35 U.S.C. 154(b) by 275 days.

(21) Appl. No.: 12/040,402

(22) Filed: Feb. 29, 2008

(65) Prior Publication Data

US 2009/0222296 A1 Sep. 3, 2009

(51) Int. Cl.
*G06F 15/16* (2006.01)

(52) U.S. Cl. .................................. 709/206

(58) Field of Classification Search ............ 709/206
See application file for complete search history.

(56) References Cited

U.S. PATENT DOCUMENTS

| | | | | |
|---|---|---|---|---|
| 5,182,709 | A * | 1/1993 | Makus ........................... | 704/9 |
| 6,498,987 | B1 * | 12/2002 | Kelly et al. ................... | 702/3 |
| 6,658,377 | B1 * | 12/2003 | Anward et al. ................. | 704/9 |
| 7,587,678 | B1 * | 9/2009 | English et al. ................. | 715/752 |
| 7,715,032 | B2 * | 5/2010 | Bird et al. ..................... | 358/1.15 |
| 7,720,720 | B1 * | 5/2010 | Sharma et al. ................. | 705/26.7 |
| 7,962,557 | B2 * | 6/2011 | Lu et al. ......................... | 709/206 |
| 2001/0023406 | A1 * | 9/2001 | Engel et al. ................... | 705/14 |
| 2001/0029455 | A1 * | 10/2001 | Chin et al. ..................... | 704/277 |
| 2002/0007400 | A1 * | 1/2002 | Pedersen ....................... | 709/206 |
| 2003/0018727 | A1 * | 1/2003 | Yamamoto .................... | 709/206 |
| 2004/0064387 | A1 * | 4/2004 | Clarke et al. .................. | 705/34 |
| 2005/0154531 | A1 * | 7/2005 | Kelly et al. ................... | 702/3 |
| 2005/0188019 | A1 * | 8/2005 | Mittelstaedt et al. .......... | 709/206 |
| 2005/0203807 | A1 * | 9/2005 | Bezos et al. .................. | 705/26 |
| 2005/0261987 | A1 * | 11/2005 | Bezos et al. .................. | 705/27 |
| 2006/0265453 | A1 * | 11/2006 | Kaminsky et al. ............. | 709/206 |
| 2007/0043818 | A1 * | 2/2007 | Cottrille et al. ............... | 709/206 |
| 2007/0106736 | A1 * | 5/2007 | Shepherd ....................... | 709/206 |
| 2007/0124399 | A1 * | 5/2007 | Gillespie et al. .............. | 709/206 |
| 2007/0171029 | A1 * | 7/2007 | Inbarajan ................... | 340/425.5 |
| 2007/0260523 | A1 * | 11/2007 | Schadt et al. .................. | 705/14 |
| 2008/0040435 | A1 * | 2/2008 | Buschi et al. ................. | 709/206 |
| 2008/0091517 | A1 * | 4/2008 | Koonce et al. ................. | 705/10 |
| 2009/0037279 | A1 * | 2/2009 | Chockalingam et al. ....... | 705/14 |
| 2009/0055481 | A1 * | 2/2009 | Carmel et al. ................. | 709/206 |
| 2009/0089654 | A1 * | 4/2009 | Wittig et al. .................. | 715/223 |
| 2009/0089664 | A1 * | 4/2009 | Wagner et al. ................ | 715/255 |
| 2009/0106650 | A1 * | 4/2009 | Haynes et al. ................. | 715/255 |
| 2009/0271272 | A1 * | 10/2009 | Berkowitz et al. .......... | 705/14.67 |
| 2011/0041140 | A1 * | 2/2011 | Harm et al. .................... | 719/318 |
| 2011/0041141 | A1 * | 2/2011 | Harm et al. .................... | 719/318 |

OTHER PUBLICATIONS

Nawaz, Zubair et al. "Recursive Variable Expansion: A Loop Transformation for Reconfigurable Systems." Field-Programmable Technology, 2007. ICFPT 2007. International Conference on Field-Programmable Technology. Dec. 12-14, 2007. IEEE. pp. 1-4 (301-304).*

* cited by examiner

*Primary Examiner* — Imad Hussain
(74) *Attorney, Agent, or Firm* — Brake Hughes Bellermann LLP (57) ABSTRACT

One or more conditions associated with personalizing a subject line of a message for each of one or more target recipients may be determined. One or more conditions may be evaluated to determine which of conditional text is included in and which of conditional variables are included with the subject line. One or more values may be determined, for each of the one or more target recipients, corresponding to each of universal variables and the conditional variables for inclusion with the subject line. The subject line of the message may be personalized for each of the one or more target recipients based on the evaluation of the one or more conditions, the subject line including text and values corresponding to the variables for inclusion with the subject line as determined based on the evaluation.

22 Claims, 5 Drawing Sheets

SUBJECT LINE PERSONALIZATION

TECHNICAL FIELD

This description relates to the personalization of subject lines.

BACKGROUND

The growth of electronic communication, including electronic marketing and promotions, has given rise to a corresponding growth in the desire to increase the efficacy of such electronic promotions. Empirical studies have shown that the more personalized an electronic promotion is to a recipient, the greater the likelihood of receiving a response to the electronic promotion from the recipient. For example, a personalized e-mail message about an upcoming sale may be delivered to a potential customer who has expressed prior interest in one or more of the sales items. It may be the case that the greater the level of personalization of the e-mail message, the greater the likelihood of receiving a response to the e-mail message.

SUMMARY

According to an example embodiment a system is provided. A condition engine may determine one or more conditions associated with personalizing a subject line of a message for each of one or more target recipients, the message including the subject line and a separate body portion. A text handler may receive text for inclusion in the subject line, the text including at least one of conditional text dependent upon an evaluation of the one or more conditions for inclusion in the subject line or universal text for inclusion in the subject line independent of the evaluation of the one or more conditions. A variable handler may determine one or more variables for inclusion with the subject line, the one or more variables including at least one of conditional variables dependent upon the evaluation of the one or more conditions for inclusion with the subject line or universal variables for inclusion with the subject line independent of the evaluation of the one or more conditions. A condition evaluator may perform the evaluation of the one or more conditions and determine which of the conditional text is included in and which of the conditional variables are included with the subject line based on the evaluation. An execution service may determine one or more values, for each of the one or more target recipients, corresponding to each of the universal variables and the conditional variables for inclusion with the subject line. An assembler may personalize the subject line of the message for each of the one or more target recipients based on the evaluation of the one or more conditions, the subject line including the universal text, the one or more values corresponding to the universal variables, and, as determined based on the evaluation, the determined conditional text for inclusion in and the one or more values corresponding to the determined conditional variables for inclusion with the subject line.

According to another example embodiment, a method is provided. A plurality of first tier conditions of a subject line template associated with a subject line of a message personalized for each of a plurality of target recipients may be determined, the plurality of first tier conditions each corresponding to alternative subject lines for the message. A first tier evaluation of the plurality of first tier conditions may be performed to determine a first subject line from the alternative subject lines for the message, the first subject line including at least one of universal text or universal variables. Second tier conditions associated with the first subject line may be determined, each of the second tier conditions being associated with at least one of conditional text or conditional variables dependent upon a second tier evaluation of the second tier conditions for inclusion in the first subject line. The second tier evaluation of the one or more second tier conditions may be performed to determine which of the conditional variables and conditional text are included in the first subject line. Values corresponding to each of the universal variables and the conditional variables included in the first subject line may be determined for each of the target recipients. The first subject line, including the universal text, the values associated with the universal variables, and the conditional text and the values corresponding to the conditional variables included in the first subject line as determined may be assembled based on the second tier evaluation. The first subject line may be provided in association with the message personalized for each of the plurality of target recipients.

According to another example embodiment, a computer program product for personalizing a subject line for a personalized e-mail message is provided. The computer program product may receive a mailform template associated with the e-mail message personalized for each of a plurality of target recipients, the mailform template including a body portion and a separate subject line template corresponding to the subject line. The computer program product may evaluate one or more conditions associated with the subject line template to determine at least one of text or one or more variables for inclusion in the subject line, wherein the one or more variables correspond to one or more values for each of the target recipients. The computer program product may personalize the subject line of the personalized e-mail message for each of the target recipients, including in the subject line the at least one of the text and one or more values for each target recipient corresponding to the one or more variables. The computer program product may provide the personalized e-mail message and personalized subject line to each of the target recipients.

The details of one or more implementations are set forth in the accompanying drawings and the description below. Other features will be apparent from the description and drawings, and from the claims.

DETAILED DESCRIPTION

Figure 1:
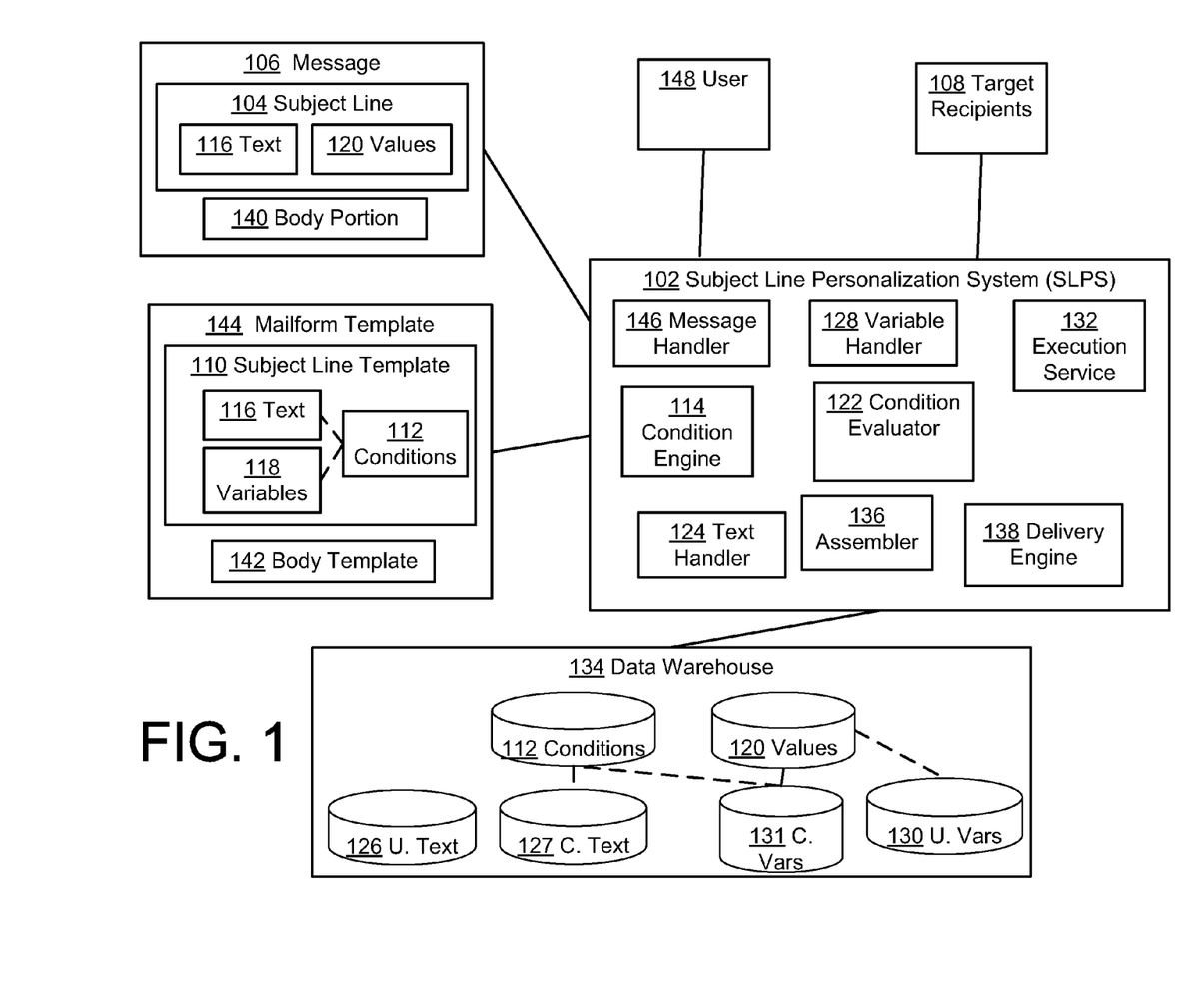
FIG. 1 is a block diagram of a subject line personalization system (SLPS), according to an example embodiment.

FIG. 1 is a block diagram of an example implementation of a subject line personalization system (SLPS) 102, according to an example embodiment. The SLPS 102 may personalize a subject line 104 for each of one or more messages 106 intended to be sent to one or more target recipients 108. The SLPS 102 may, for example, allow a vendor of a product and/or service to send an e-mail (e.g., message 106) as part of a marketing campaign to potential customers (e.g., target recipients 108) who may be interested in receiving the promotion. According to an example embodiment, the vendor may personalize the subject line 104 of each of the e-mails based on which customer is receiving the message 106, including specific information that may have been collected and/or otherwise associated with each customer.

The subject line 104 may include a header or summary portion of the message 106. The subject line 104 may include a brief description associated with the message 106. For example, the subject line 104 may include the subject line of an e-mail message that may be viewed by a recipient of the e-mail prior to opening the contents of the e-mail. According to example embodiments, the content of the subject line 104 may generally be associated with the sender of the message 106, recipient of the message 106 and/or contents of the message 106. In other example embodiments however, the content of the subject line 104 may be unrelated to the message 106 and may include whatever content a sender deems appropriate.

The message 106 may include any message that may be transmitted from one party to another. For example, the message 106 may include an e-mail, SMS, fax and/or other message. Then for example, based on which target recipient 108 the message 106 is intended and/or the contents of the message 106, the subject line 104 may be personalized or modified accordingly.

The target recipients 108 may include one or more intended and/or actual recipients of the message 106. The target recipients 108 may include, for example, a list of current, past and/or potential customers to whom a vendor wants to market a product and/or service. Then for example, the vendor may create the message 106 to be sent to the target recipients 108, wherein the subject line 104 of the message 106 may be customized or personalized for each target recipient 108.

The subject line 104 of the message 106 may be associated with a subject line template 110. The subject line template 110 may include a template, format, outline, model or other structure associated with determining the content of the subject line 104. The subject line template 110 may include for example numerous variations of the subject line 104, one of which may be selected for each target recipient 108.

Each variation on the content of the subject line 104 may be based on the fulfillment of one or more conditions 112. The conditions 112 may include one or more rules, requisites, limitations, or other conditions for determining the content of the subject line 104 for each target recipient 108. For example, the content of the subject line 104 may change depending on the language, income and/or credit history of the target recipient 108, including any number of other factors.

A condition engine 114 may determine the conditions 112 associated with personalizing the subject line 104 from the subject line template 110. For example, the condition engine 114 may parse or otherwise analyze the subject line template 110 to determine the conditions 112 of the subject line template 110.

The conditions 112 may be associated with at least one of either text 116 or one or more variables 118. The text 116 may include any alpha-numeric and/or symbolic string or strings of characters to be included in the subject line 104 based on the fulfillment of one or more of the conditions 112. For example, the text 116 of the subject line 104 may change depending on the sex of the target recipient 108 of the message. For example, the text 116 for a male recipient may include "Hello Sir", while the text 116 for a female recipient may include "Good Afternoon Miss". Then for example, the condition 112 associated with determining which text 116 to use may include determining the gender or sex of the target recipient 108.

The variables 118 may include one or more variables and/or placeholders that correspond to some piece of information stored or otherwise collected about the target recipients 108. For example, the variables 118 may include the credit score, gender, location and/or age of the target recipients 108. Then for example, for each target recipient 108, one or more values 120 may correspond to each of the variables 118. The values 120 may include the alpha-numeric, string, symbolic, N/A and/or other values or information that correspond to the variables 118 for the target recipients 108. The values 120 may then be used to evaluate one or more of the conditions 112 and/or be included within the content of the subject line 104.

A condition evaluator 122 may be configured to evaluate the conditions 112 of the subject line template 110. For example, for each target recipient 108, the condition evaluator 122 may evaluate the conditions 112 to determine which content to include in the subject line 104.

A text handler 124 may be configured to determine which of the text 116 is to be included in the content of the subject line 104 based on the evaluation of the conditions 112. The text 116 may include universal text 126 and/or conditional text 127. The universal text 126 may be included in the subject line 104 independent of the evaluation of at least one or more of the conditions 112. For example, the universal text 126 may be included in the subject line 104 regardless of the age, nationality, gender or credit score of the target recipients 108.

The conditional text 127 may include text 116 to be included in the subject line 104 upon the evaluation and/or fulfillment of one or more of the conditions 112. For example, the conditional text 127 may include "Namaste" if the target recipient lives in India or "Hello" if the target recipient lives in the United States. In other example embodiments, the conditional text 127 may be included depending upon the fulfillment of numerous conditions 112.

A variable handler 128 may be configured to determine which of the variables 118 is to be included with the content of the subject line 104 based on the evaluation of the conditions 112. The variables 118 may include universal variables 130 and/or conditional variables 131. The values 120 corresponding to the universal variables 130 may be included in the subject line 104 independent of the evaluation of at least one or more of the conditions 112. For example, the universal variables 130 may include 'salutation' and 'first_name', whereby the subject line 104 may include the salutation (e.g., Mr., Ms., Mrs., Dr.) and first name of each target recipient 108 independent of the evaluation of the conditions 112.

The conditional variables 131 may include variables 118 to be included with the subject line 104 upon the evaluation and/or fulfillment of one or more of the conditions 112. For example, if the target recipient 108 lives in the United States, then the conditional variables 131 "state" and "zip_code" may be included with the subject line 104.

An execution service 132 may be configured to determine the values 120 corresponding to the variables 118, including the universal variables 130 and conditional variables 131. For example, the execution service 132 may retrieve and/or otherwise determine the values 120 for the variables 118 for evaluating the conditions 112. Then for example, the execution service 132 may retrieve and/or otherwise determine the values 120 corresponding to the universal variables 130 and conditional variables 131 to be included with the subject line 104 (as may have been determined based on the evaluation of the conditions 112).

According to an example embodiment, the execution service 132 may determine the values 120 from a data warehouse 134. The data warehouse 134 may include a database, server, spreadsheet and/or other storage unit and/or facility configured to store information associated with the personalization of the subject line 104. For example, the data warehouse 134 may include or store the universal text 126, the conditions 112, the conditional text 127, the conditional variables 131, the values 120 and the universal variables 130.

An assembler 136 may personalize the subject line 104 of the message 106 for each of the target recipients 108 based on the evaluation of the conditions 112. The assembler 136 may, for example, include in the subject line 104 the universal text 126, the values 120 corresponding to the universal variables 130, and the conditional text 127 and the values 120 corresponding to the conditional variables 131 as may be determined to be included in the subject line 104 based on the evaluation of the conditions 112.

A delivery engine 138 may transmit, provide, or otherwise deliver the message 106, including the personalized subject line 104, to the target recipients 108. For example, the delivery engine 138 may provide the message 106, including the personalized subject line 104, to the proper network or port such that the message 106 may be routed to the appropriate target recipient 108. Then for example, the target recipient 108 may receive the message 106 in his or her inbox and may view the personalized subject line 104 associated with the message 106.

The message 106, in addition to including the personalized subject line 104, may also include a body portion 140. The body portion 140 may include the body or content of the message 106. According to an example embodiment, the body portion 140 may be personalized based on for which target recipient 108 the message 106 is intended. For example, different target recipients 108 may receive different promotions from the same vendor. The different promotions may be based on, for example, the purchase history, credit limit and/or industry in which the target recipient 108 operates.

The body portion 140 may be associated with a body template 142. The body template 142 may include a template, format, outline, model or other structure associated with determining the content of the body portion 140 of the message 106. Though not shown in FIG. 1, the body template 142, similar to the subject line template 110, may also include conditions 112, text 116 and/or variables 118. Then for example, the body portion 140 may be personalized for each target recipient 108 based on an evaluation of the body template 142, including one or more conditions 112 therein.

The body template 142 and the subject line template 110 may be combined into a mailform template 144. The mailform template 144 may include a template, format, outline, model or other structure associated with personalizing the content of the message 106 for the target recipients 108. The mailform template 144 may include a hierarchical template that includes desired elements of communication for inclusion in the message 106 intended for each target recipient 108. The hierarchical nature of the mailform template 144 (including the subject line template 110 and body template 142) may include a first or global level of elements and one or more sub-levels, as may be referenced in FIG. 2.

A message handler 146 may be configured to determine or receive the mailform template 144 associated with the message 106 from a user 148. The message handler 146 may, for example, parse the mailform template 144 for the subject line template 110 and provide the subject line template 110 to the condition engine 114 as referenced above.

The user 148 may include any user of the SLPS 102. The user 148 may for example determine which text 116, variables 118 and/or conditions 112 are to be included in the subject line template 110. The user 148 may also determine to which target recipients 108 the message 106 is to be delivered. According to an example embodiment, as referenced above, the user 148 may include a vendor of a product and/or service who may use the SLPS 102 to institute a marketing campaign to the target recipients 108. The SLPS 102 may then personalize the subject line 104 of each message 106 and provide the personalized messages 106 to the target recipients.

Figure 2:
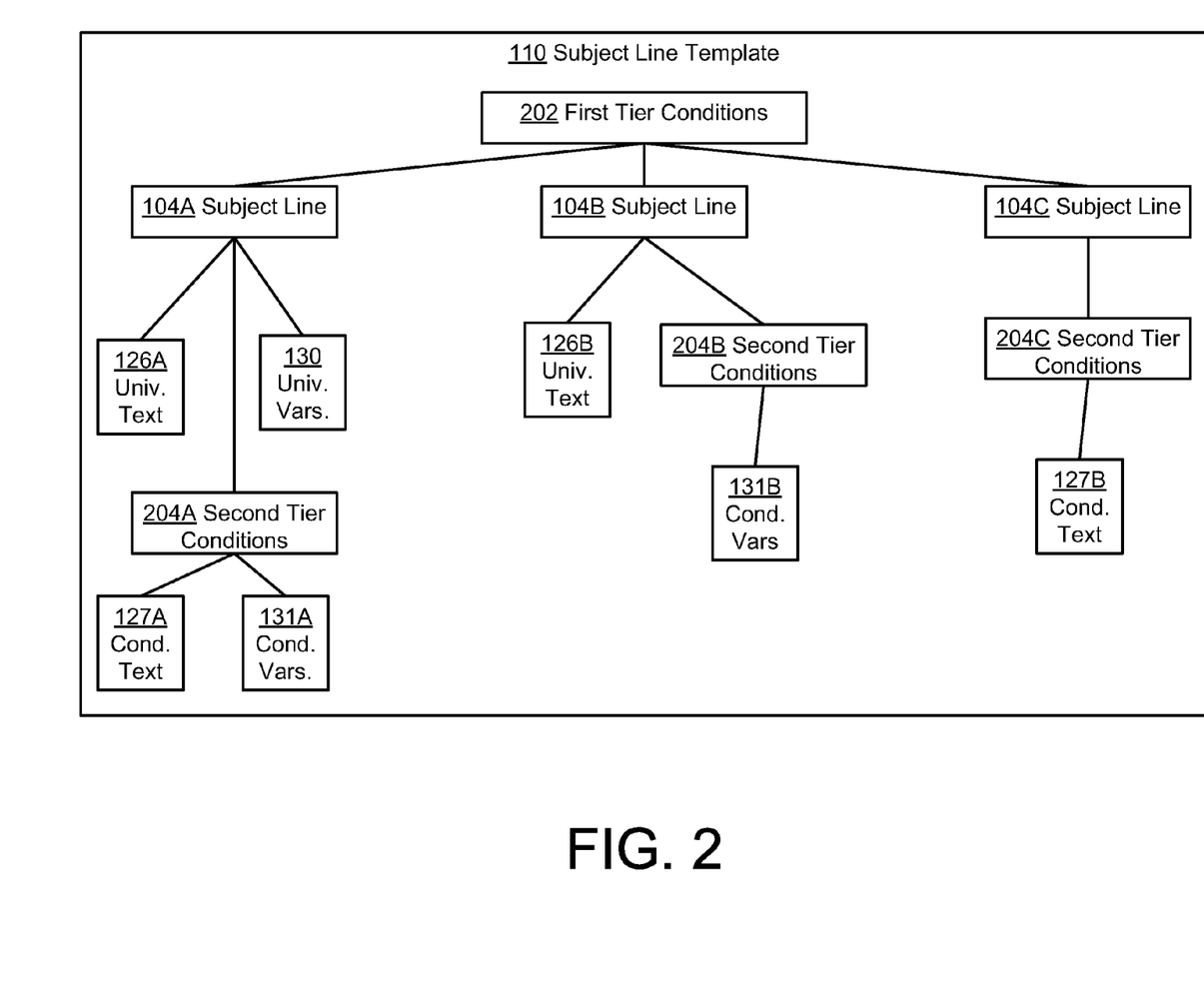
FIG. 2 is a block diagram of an example subject line template, according to an example embodiment.

FIG. 2 is a block diagram of an example subject line template 110, according to an example embodiment. As referenced above, the subject line template 110 may include a hierarchy as shown in FIG. 2. The hierarchy may include first tier conditions 202 and second tier conditions 204A, 204B and 204C.

According to an example embodiment, the first tier conditions 202 may include one or more rules, requisites, limitations, or other conditions for determining which of a number of alternative subject lines to include in a message. For example, the first tier conditions may be evaluated to determine which of the subject lines 104A, 104B or 104C to include in a personalized message (e.g., 106) to one or more target recipients (e.g., 108), wherein the message for each target recipient may include a different subject line 104A-C. For example, the subject lines 104A-C may be drafted based on the location of the target recipient, wherein each subject line 104A-C takes into account the language and/or customs of a different nation. Then for example, the first tier conditions 202 may include determining the location, nationality and/or language associated with each target recipient, and then, based on that information, determining which subject line 104A-C to use.

According to an example embodiment, the second tier conditions 204A-C may include one or more rules, requisites, limitations, or other conditions for determining the content of the subject lines 104A-C for each target recipient 108. For example, the second tier conditions 204A may be evaluated to determine which of the conditional text 127A and/or conditional variables 131A to include in the subject line 104A. The second tier conditions 204B may be evaluated to determine which, if any, of the conditional variables 131B to include in the subject line 104B. The second tier conditions 204C may be evaluated to determine which, if any, of the conditional text 127B to include in the subject line 104C. In the example of the subject line 104C, it may be that based upon the evaluation of the second tier conditions 204C, that the personalized subject line 104C is left empty where none of the conditional text 127B is to be included in the subject line 104C.

Figure 3:
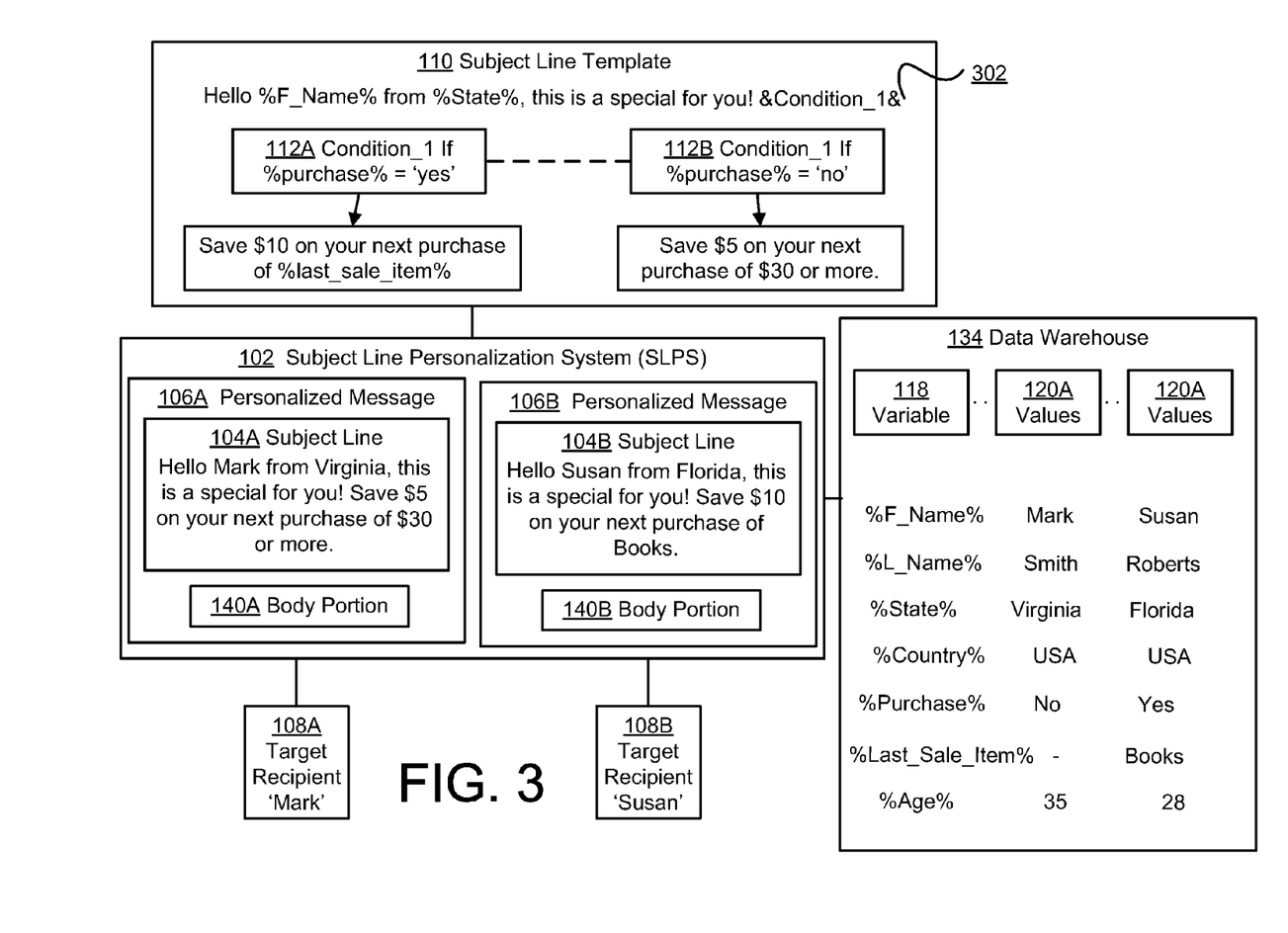
FIG. 3 is a block diagram of an example operation of the subject line personalization system (SLPS), according to an example embodiment.

FIG. 3 is a block diagram of an example operation of the subject line personalization system (SLPS) 102, according to an example embodiment. The data warehouse 134 may include the variables 118 and the corresponding values 120A and 120B for each of two target recipients 108A "Mark" and 108B "Susan". The subject line personalization system (SLPS) 102 may evaluate the subject line template 110 to determine what content to include in the subject line 104A and 104B for each target recipient 108A and 108B, respectively.

The subject line template 110 may include a base content structure 302 including one or more of text, variables and conditions (e.g., 116, 118, 112) for determining the content of the subject lines 104A and 104B. For example, the variables 118 may be designated by a beginning and an ending "%" symbol. Thus, the base content structure 302 may include the variables "F_Name" and "State", the text "Hello . . . from . . . , this is a special for you!", and the condition "& Condition_1&".

Then for example, the SLPS 102 may evaluate the base content structure 302 for the first target recipient 108A, based on the information included in the data warehouse 134 and generate the subject line 104A. For example, the variables F_Name and State may be replaced with the values "Mark" and "Virginia", respectively. Then upon the evaluation of the Condition_1, the SLPS 102 may determine to include the text in the resultant box associated with the variable purchase having a value of "no". Then for example, the SLPS 102 may perform the evaluation for the remainder of the target recipients (e.g., 108B) and provide the personalized messages 106A and 106B to the target recipients 108A and 108B, respectively.

Figure 4:
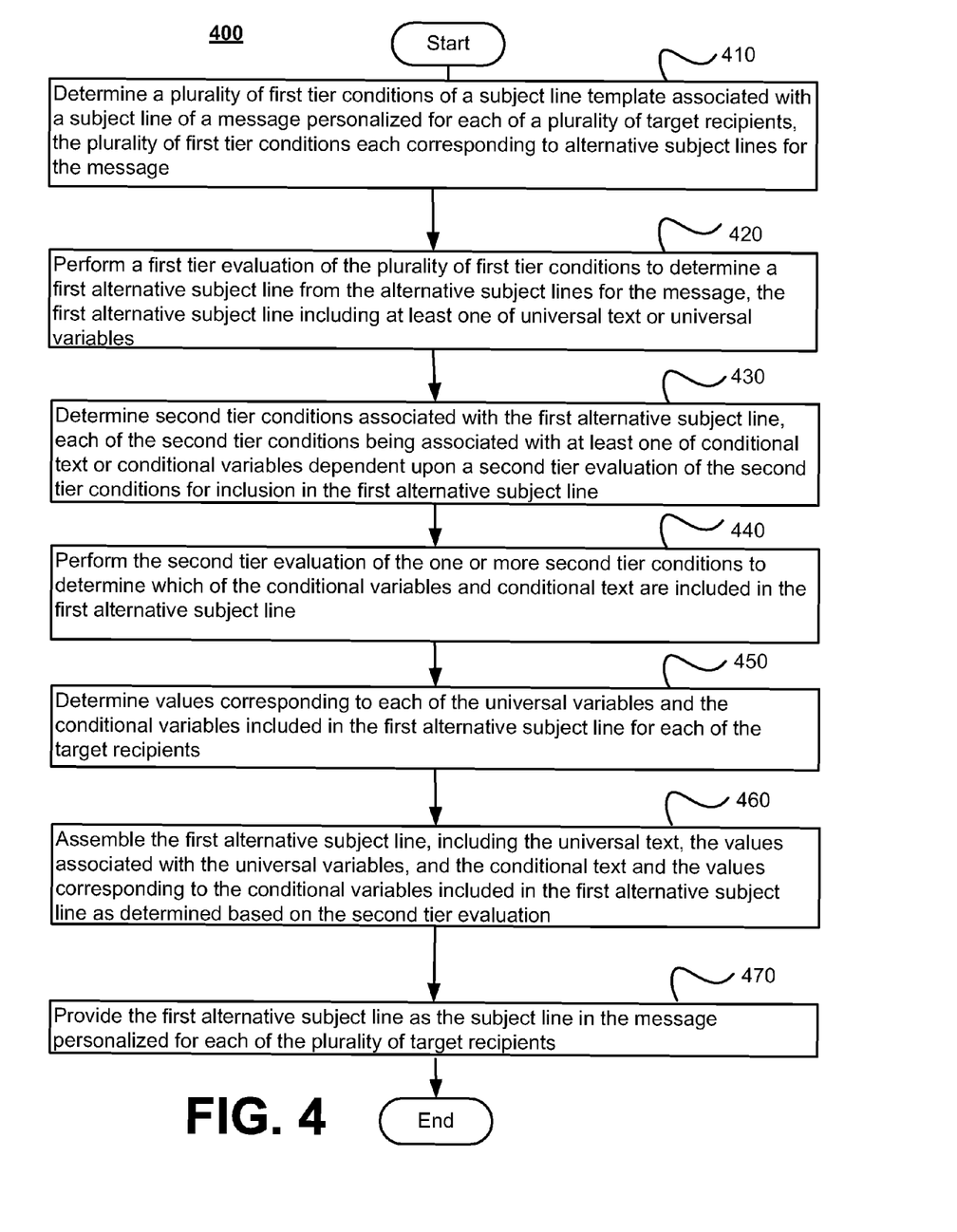
FIG. 4 is a flowchart illustrating example operations of a subject line personalization system, according to an example embodiment.

FIG. 4 is a flowchart 400 illustrating example operations of a subject line personalization system, according to an example embodiment. More specifically, FIG. 4 illustrates an operational flow 400 representing example operations related to a subject line personalization system 102.

After a start operation, a plurality of first tier conditions of a subject line template associated with a subject line of a message personalized may be determined for each of a plurality of target recipients, the plurality of first tier conditions each corresponding to alternative subject lines for the message (410). For example, as shown in FIG. 2, the first tier conditions 202 of the subject line template 110 may be associated with alternative subject lines 104A-C.

A first tier evaluation of the plurality of first tier conditions may be performed to determine a first subject line from the alternative subject lines for the message, the first subject line including at least one of universal text or universal variables (420). For example, an evaluation of the first tier conditions 202 may determine the subject line 104A which includes both the universal text 126A and universal variables 130.

Second tier conditions associated with the first subject line may be determined wherein each of the second tier conditions may be associated with at least one of conditional text or conditional variables dependent upon a second tier evaluation of the second tier conditions for inclusion in the first subject line (430). For example, the second tier conditions 204A being associated with the conditional text 127A and conditional variables 131A for inclusion in the subject line 104A.

The second tier evaluation of the one or more second tier conditions may be performed to determine which of the conditional variables and conditional text are included in the first subject line (440). For example, the second tier conditions 204A may be evaluated, to determine which of the conditional text 127A and/or conditional variables 131A are to be included in the subject line 104A.

Values corresponding to each of the universal variables and the conditional variables included in the first subject line for each of the target recipients may be determined (450). For example, as shown in FIG. 3, the values 120A corresponding to the variables 118 may be determined for the first target recipient 108A.

The first subject line, including the universal text, the values associated with the universal variables, and the conditional text and the values corresponding to the conditional variables included in the first subject line as determined based on the second tier evaluation may be assembled (460). For example, the subject line 104A (FIG. 3) may be assembled and may include the values 120A corresponding to the variables 118 for the first target recipient 108A.

The first subject line may be provided in association with the message personalized for each of the plurality of target recipients (470). For example, the subject lines 104A and 104B may be provided in association with the personalized messages 106A and 106B for the target recipients 108A and 108B, respectively.

Figure 5:
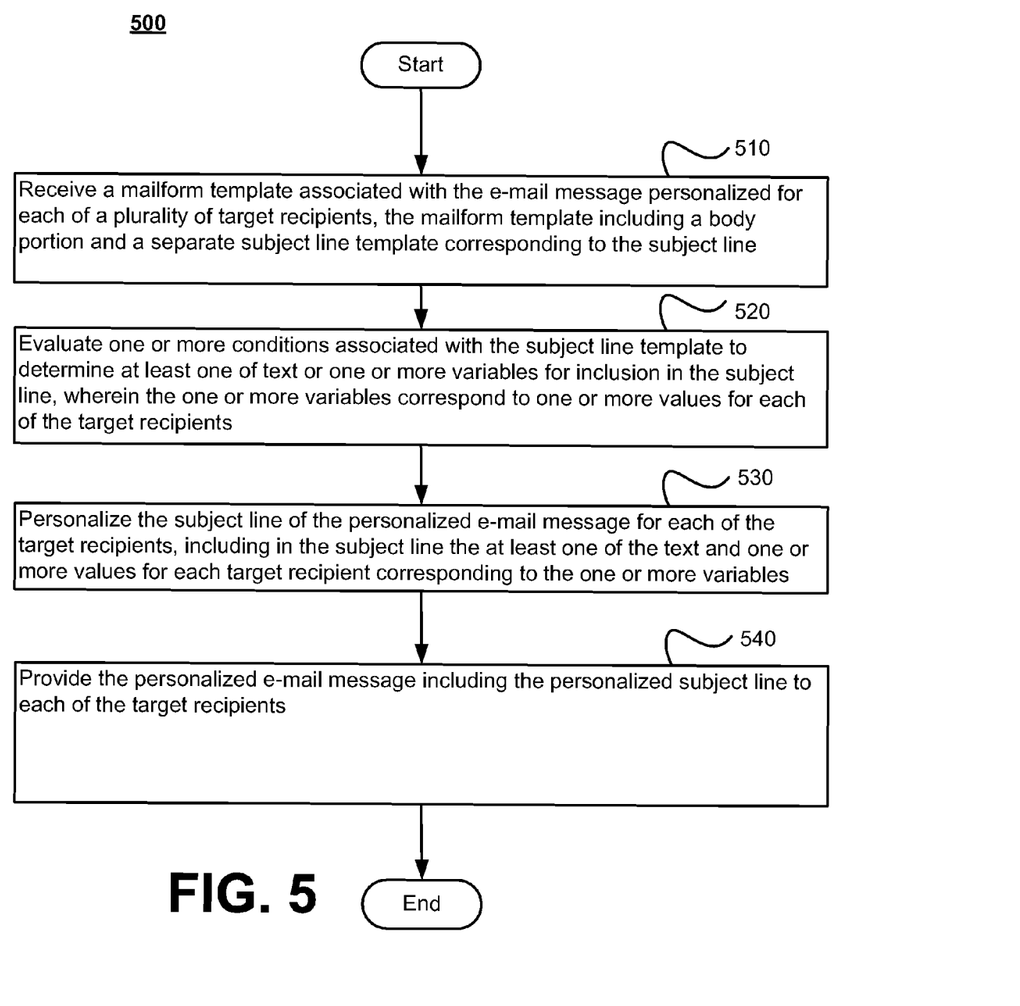
FIG. 5 is a flowchart illustrating example operations of a subject line personalization system, according to an example embodiment.

FIG. 5 is a flowchart 500 illustrating example operations of a subject line personalization system, according to an example embodiment. More specifically, FIG. 5 illustrates an operational flow 500 representing example operations related to a subject line personalization system 102.

After a start operation, a mailform template associated with an e-mail message personalized for each of a plurality of target recipients may be received, the mailform template including a body portion and a separate subject line template corresponding to the subject line (510). For example, as shown in FIG. 1, the message handler 146 may receive the mailform template 144 associated with the message 106 for each of the target recipients 108. The mailform template 144 may include the body template 142 and subject line template 110, which may correspond to the body portion 140 and the subject line 104 of the message 106, respectively.

One or more conditions associated with the subject line template may be evaluated to determine at least one of text or one or more variables for inclusion in the subject line, wherein the one or more variables correspond to one or more values for each of the target recipients (520). For example, the condition evaluator 122 may evaluate the conditions 112 to determine at least one of the text 116 or variables 118 for inclusion in the subject line 104. The variables 118 may correspond to one or more values 120 for each of the target recipients 108.

The subject line of the personalized e-mail message may be personalized for each of the target recipients, including in the subject line the at least one of the text and one or more values for each target recipient corresponding to the one or more variables (530). For example, the assembler 136 may assemble the subject line 104 of the message 106 for each of the target recipients 108, the subject line 104 including at least one of the text 116 or the values 120 corresponding to the variables 118.

The personalized e-mail message including the personalized subject line may be provided to each of the target recipients (540). For example, the delivery engine 138 may provide the personalized message 106, including the personalized body portion 140 and personalized subject line 104 to each of the target recipients 108.

Although the above description is provided in terms of specific examples, it will be appreciated that many other examples and settings are contemplated. For example, the term business document may be interpreted broadly as including any document that is used in profit generation of some sort, although the business document 104 also may refer to documents for non-profit endeavors as well, including, for example, schools, churches, charities, hospitals, or virtually any other organization. Further, the business document 104 is merely an example, and other applications, such as applications for personal use, also may be used.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the embodiments.

What is claimed is:

1. A non-transitory computer-readable storage medium including instructions that when executed by at least one processor implement a computer system comprising:
   a condition engine configured to determine one or more conditions associated with data for each of a plurality of target recipients, the message including a subject line and a separate body portion, the one or more conditions being received from a user different than the plurality of target recipients;
   a text handler configured to receive text for inclusion in the subject line, the text including at least one of conditional text dependent upon an evaluation of the one or more conditions for inclusion in the subject line or universal text for inclusion in the subject line independent of the evaluation of the one or more conditions;
   a variable handler configured to determine one or more variables for inclusion with the subject line, the one or more variables including at least one of conditional variables dependent upon the evaluation of the one or more conditions for inclusion with the subject line or universal variables for inclusion with the subject line independent of the evaluation of the one or more conditions;
   a condition evaluator configured to perform the evaluation of the one or more conditions and determine which of the conditional text is included in and which of the conditional variables are included with the subject line based on the evaluation;
   an execution service configured to determine one or more values, for each of the one or more target recipients, corresponding to each of the universal variables and the conditional variables for inclusion with the subject line; and
   an assembler configured to personalize the subject line of the message for each of the plurality of target recipients based on the evaluation of the one or more conditions, the subject line including the universal text, the one or more values corresponding to the universal variables, and, as determined based on the evaluation, the determined conditional text for inclusion in and the one or more values corresponding to the determined conditional variables for inclusion with the subject line, the conditional text including a word in a first language for a first target recipient of the plurality of target recipients, the conditional text including a word in a second language different than the first language for a second target recipient of the plurality of target recipients different than the first target recipient.

2. The medium of claim 1 wherein the system further comprising a message handler configured to determine a mailform template associated with the message.

3. The medium of claim 1 wherein the condition engine is configured to determine the one or more conditions, wherein the one or more conditions are associated with at least one of the universal text, conditional text, universal variables or conditional variables.

4. The medium of claim 1 wherein the condition engine is configured to determine the one or more conditions from a subject line template associated with personalizing the subject line.

5. The medium of claim 1 wherein the condition evaluator is configured to make a condition determination, based on the one or more values for each of the plurality of target recipients, whether the one or more conditions are pertinent for each of the plurality of target recipients.

6. The medium of claim 5 wherein the condition evaluator is configured to determine which of the conditional text or conditional variables are included in the subject line based on the condition determination.

7. The medium of claim 1 wherein the condition evaluator is configured to determine which of two or more alternative subject lines to associate with the message intended for each of the one or more target recipients based on the evaluation.

8. The medium of claim 1 wherein the execution service is configured to retrieve the one or more values, for each of the one or more target recipients, corresponding to the variables associated with the subject line and variables associated with the body portion, from a data warehouse.

9. The medium of claim 1 wherein the assembler is configured to assemble the subject line based on an order of the universal text, the one or more values corresponding to the universal variables, and, as determined based on the evaluation, the determined conditional text for inclusion in and the one or more values corresponding to the determined conditional variables in a subject line template associated with personalizing the subject line.

10. The medium of claim 1 wherein the system further comprises a delivery engine configured to transmit the message, including the body portion and the subject line personalized for each of the one or more target recipients, to each of the plurality of target recipients.

11. The system of claim 1, wherein the data for each of the plurality of target recipients includes data associated with a prior behavior of the plurality of target recipients.

12. The system of claim 1, wherein the data for each of plurality of target recipients includes data associated with a prior purchase of each of the plurality of target recipients.

13. The system of claim 1, wherein the one or more conditions includes the location of each of the plurality of target recipients.

14. A computer-implemented method for causing at least one processor to execute instructions recorded on a computer-readable storage medium, the method comprising:
    determining, by the at least one processor, a plurality of first tier conditions of a subject line template associated with a subject line of a message personalized for each of a plurality of target recipients, the plurality of first tier conditions each corresponding to alternative subject lines for the message, the first tier conditions being received from a user different than the target recipients, at least one of the first tier conditions being associated with a location of each of the plurality of target recipients;
    performing a first tier evaluation of the plurality of first tier conditions to determine a first alternative subject line from the alternative subject lines for the message, the first alternative subject line including at least one of universal text or universal variables;
    determining second tier conditions associated with the first alternative subject line, each of the second tier conditions being associated with at least one of conditional text or conditional variables dependent upon a second tier evaluation of the second tier conditions for inclusion in the first alternative subject line, the second tier conditions being associated with data of each of the target recipients;
    performing the second tier evaluation of the one or more second tier conditions to determine which of the conditional variables and conditional text are included in the first alternative subject line;
    determining values corresponding to each of the universal variables and the conditional variables included in the first alternative subject line for each of the target recipients;
    assembling the first alternative subject line, including the universal text, the values associated with the universal variables, and the conditional text and the values corresponding to the conditional variables included in the first alternative subject line as determined based on the second tier evaluation; and
    providing the first alternative subject line as the subject line in the message personalized for each of the plurality of target recipients.

15. The method of claim 14 wherein the performing the first tier evaluation comprises evaluating the first tier conditions for each of the one or more target recipients based on the values.

16. The method of claim 14 wherein the performing the second tier evaluation comprises evaluating the one or more second tier conditions for each of the one or more target recipients based on the values.

17. The method of claim 14 wherein the determining values comprises determining the values based on at least one of the first tier evaluation or second tier evaluation.

18. The method of claim 14 wherein the assembling comprises ordering, based on the subject line template, the universal text, the values associated with the universal variables, and the conditional text and the values corresponding to the conditional variables in the first subject line.

19. The method of claim 14 further comprising delivering, to each of the one or more target recipients, the message including the first alternative subject line as the subject line of the message personalized for each of the one or more target recipients.

20. The method of claim 14, wherein the data of each of the target recipients includes data associated with a prior behavior of the target recipients.

21. The method of claim 14, wherein the data of each of the target recipients includes data associated with a prior purchase of the target recipients.

22. The method of claim 14, wherein at least one of the first tier conditions is associated with a language spoken by each of the target recipients.

* * * * *